Aug. 18, 1936.  A. H. OELKERS  2,051,650
TRUCK
Filed Jan. 19, 1933  9 Sheets-Sheet 1
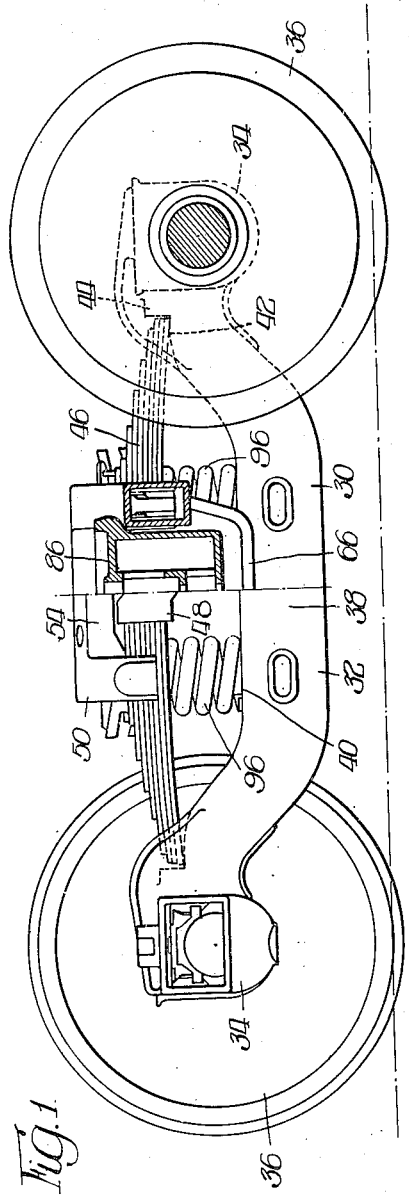
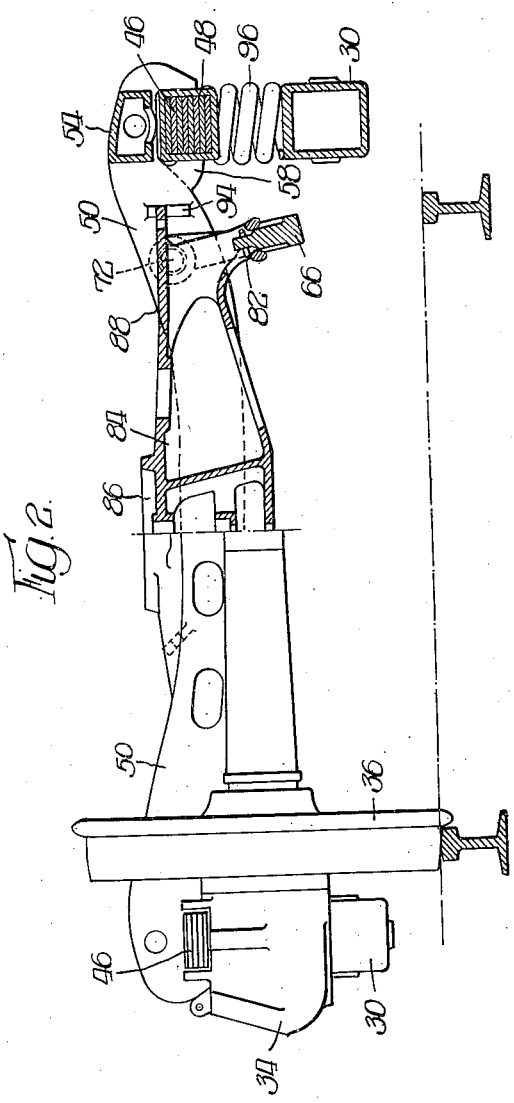
Inventor:
Alfred H. Oelkers,
By Wilkinson, Huxley, Byron & Knight
attys

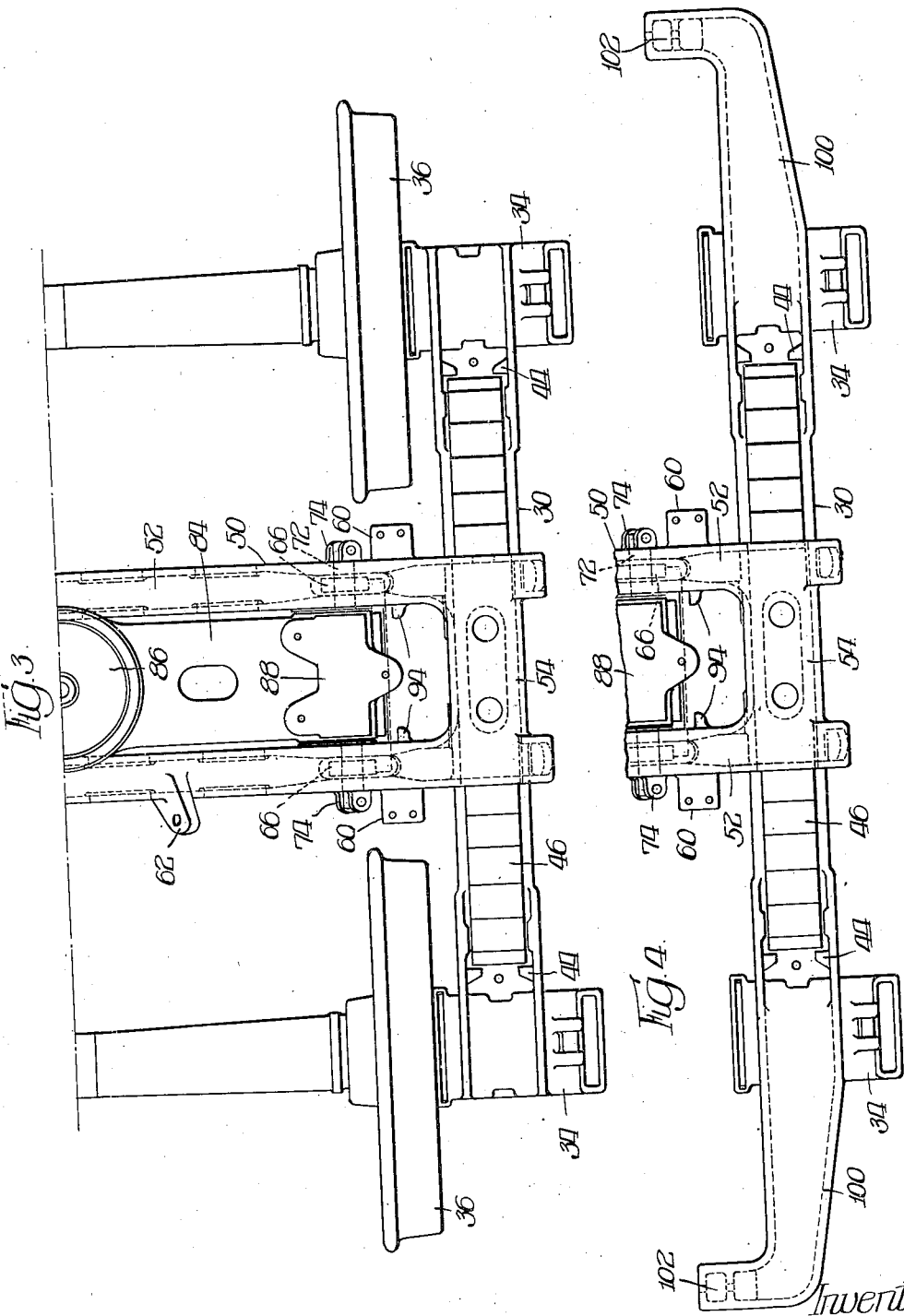

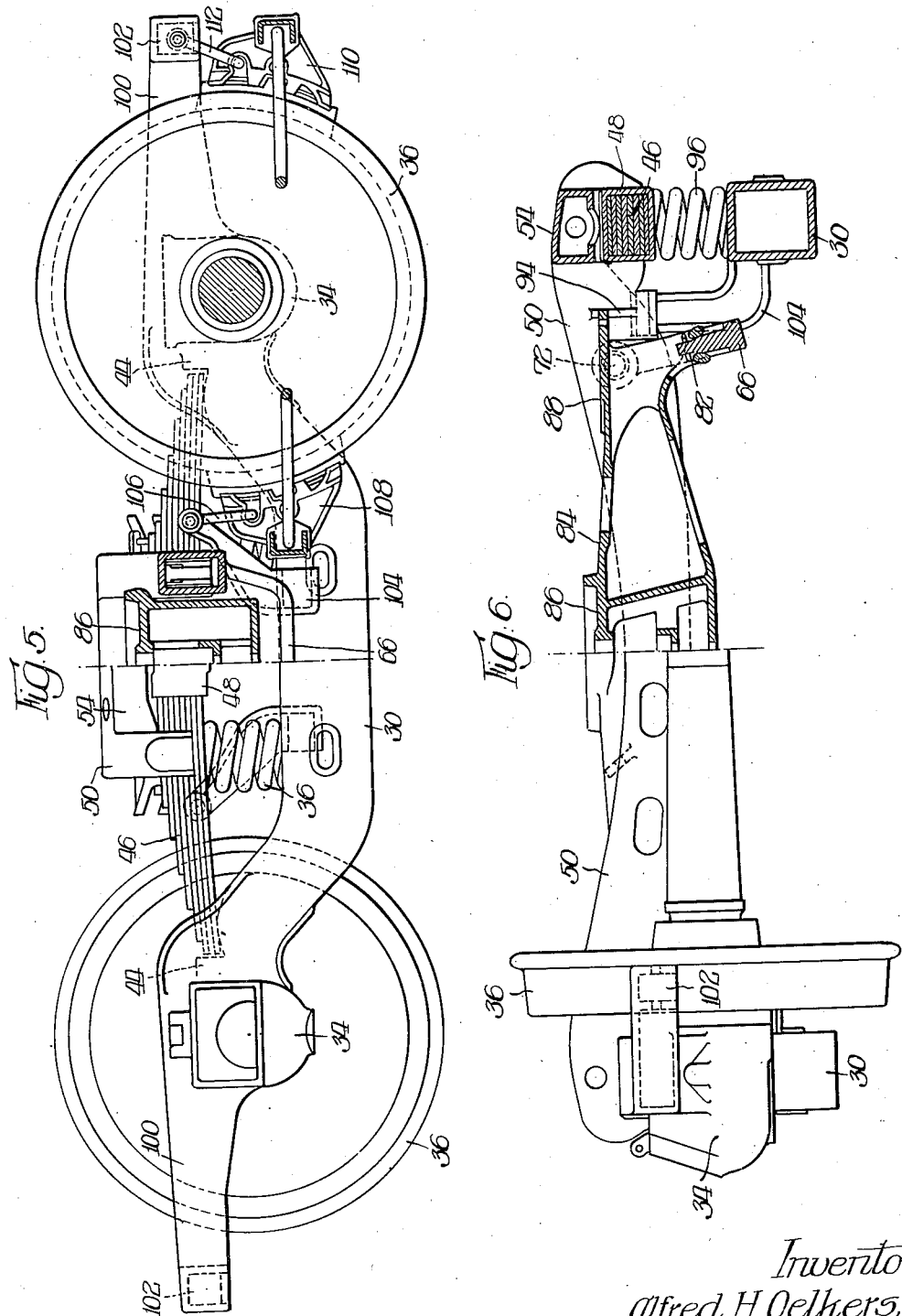

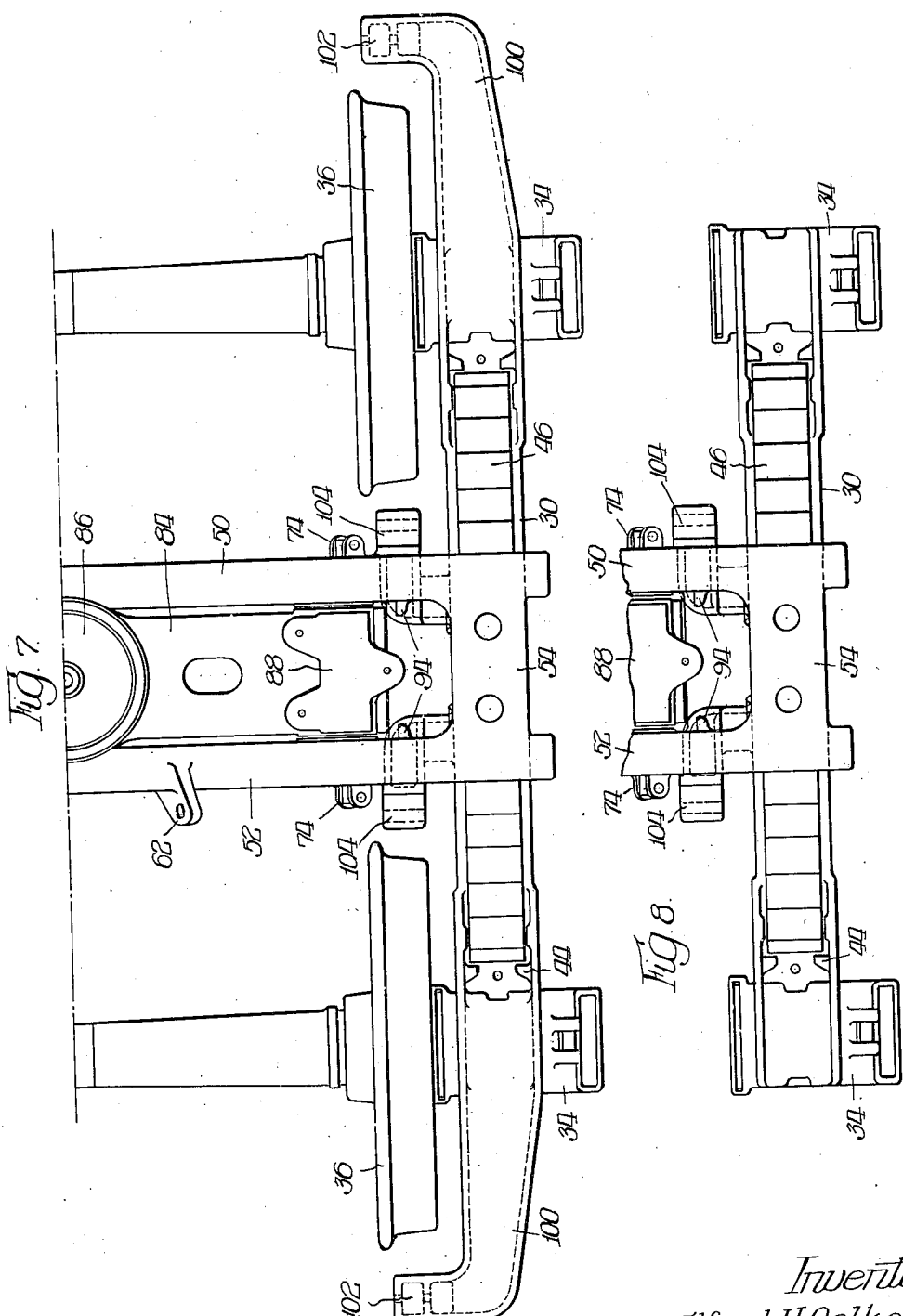

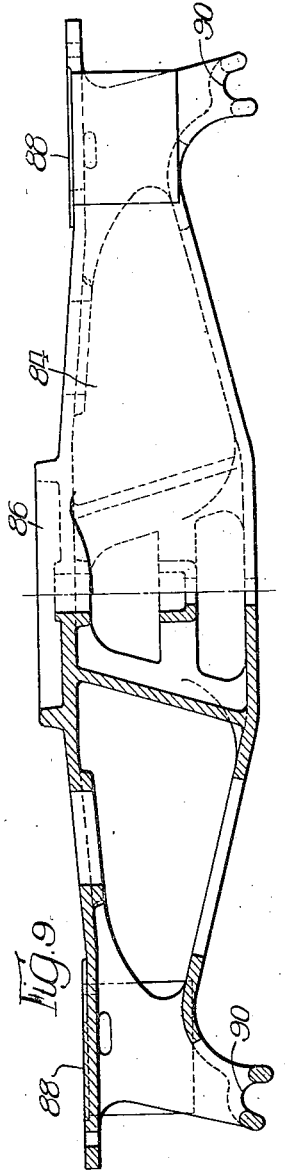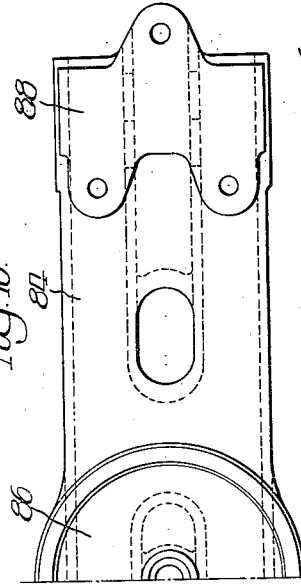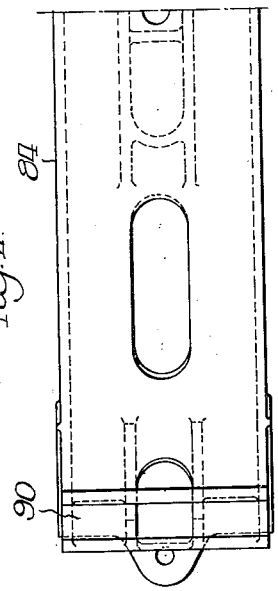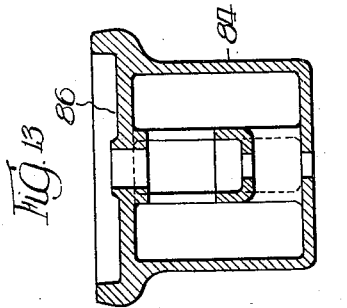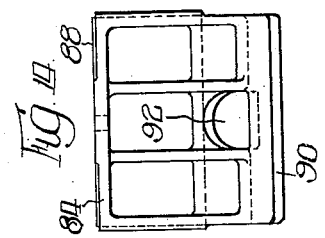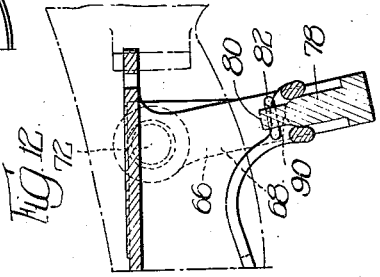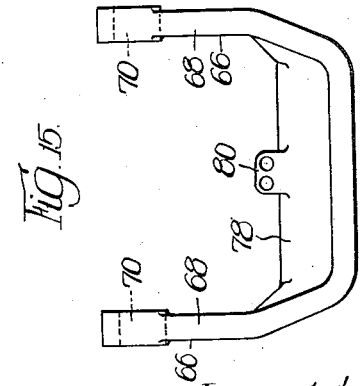

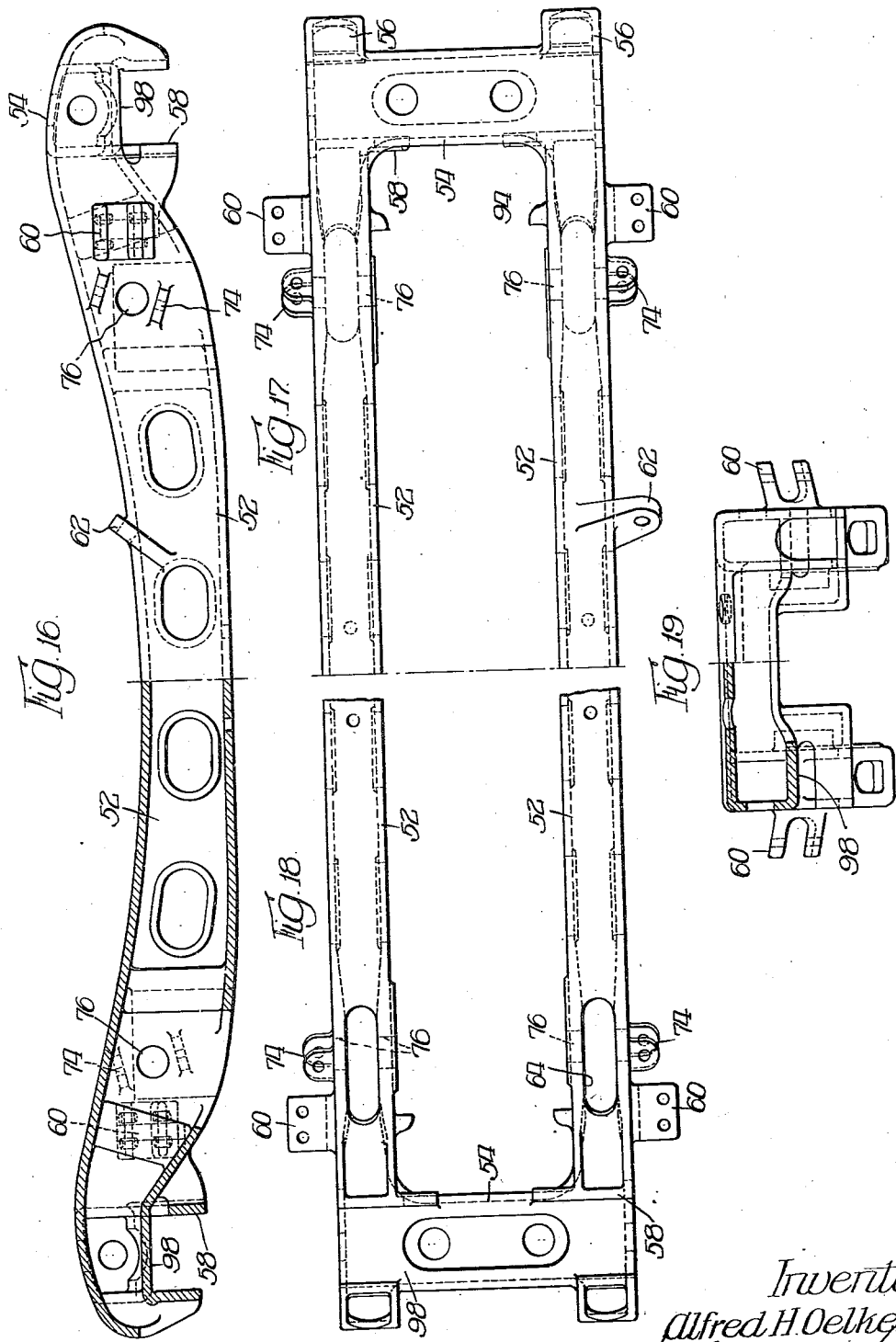

Aug. 18, 1936.  A. H. OELKERS  2,051,650
TRUCK
Filed Jan. 19, 1933  9 Sheets-Sheet 7
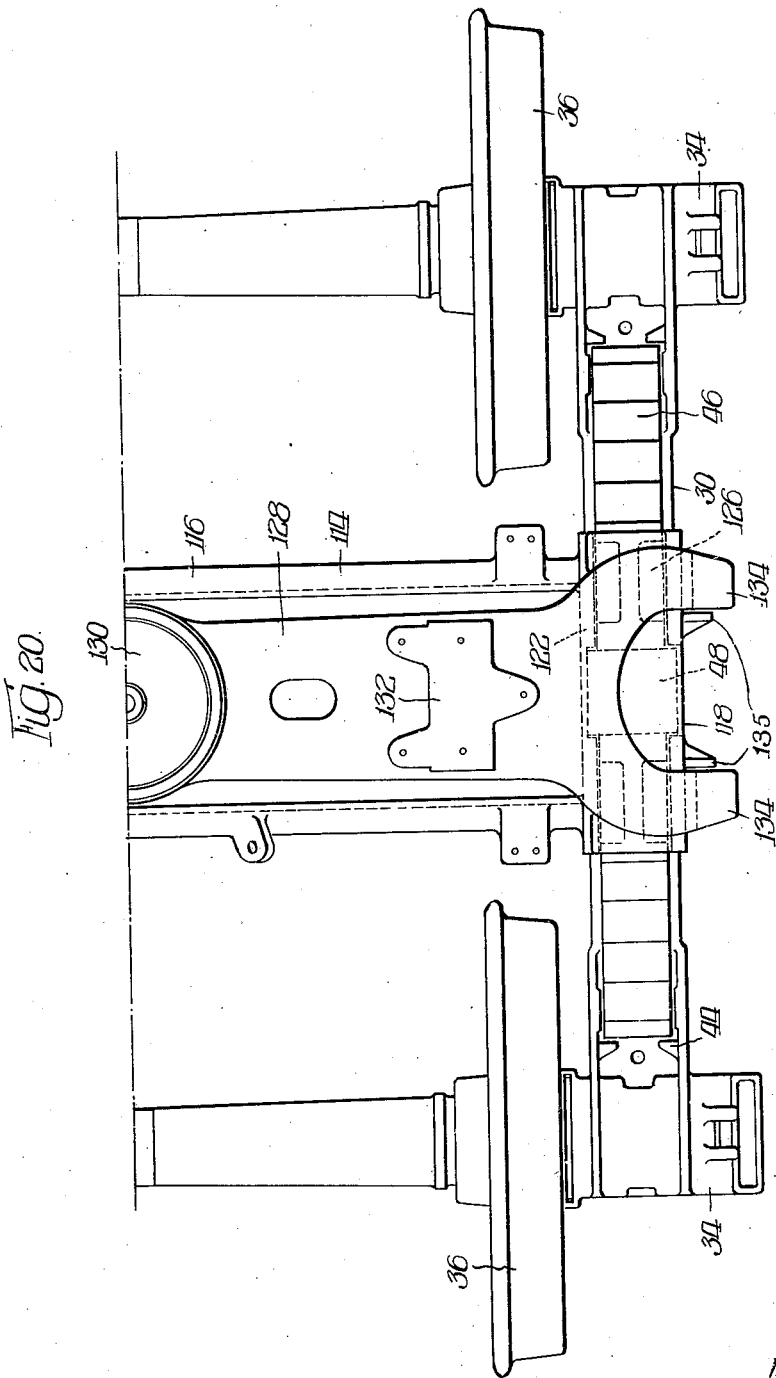
Inventor:
Alfred H. Oelkers,

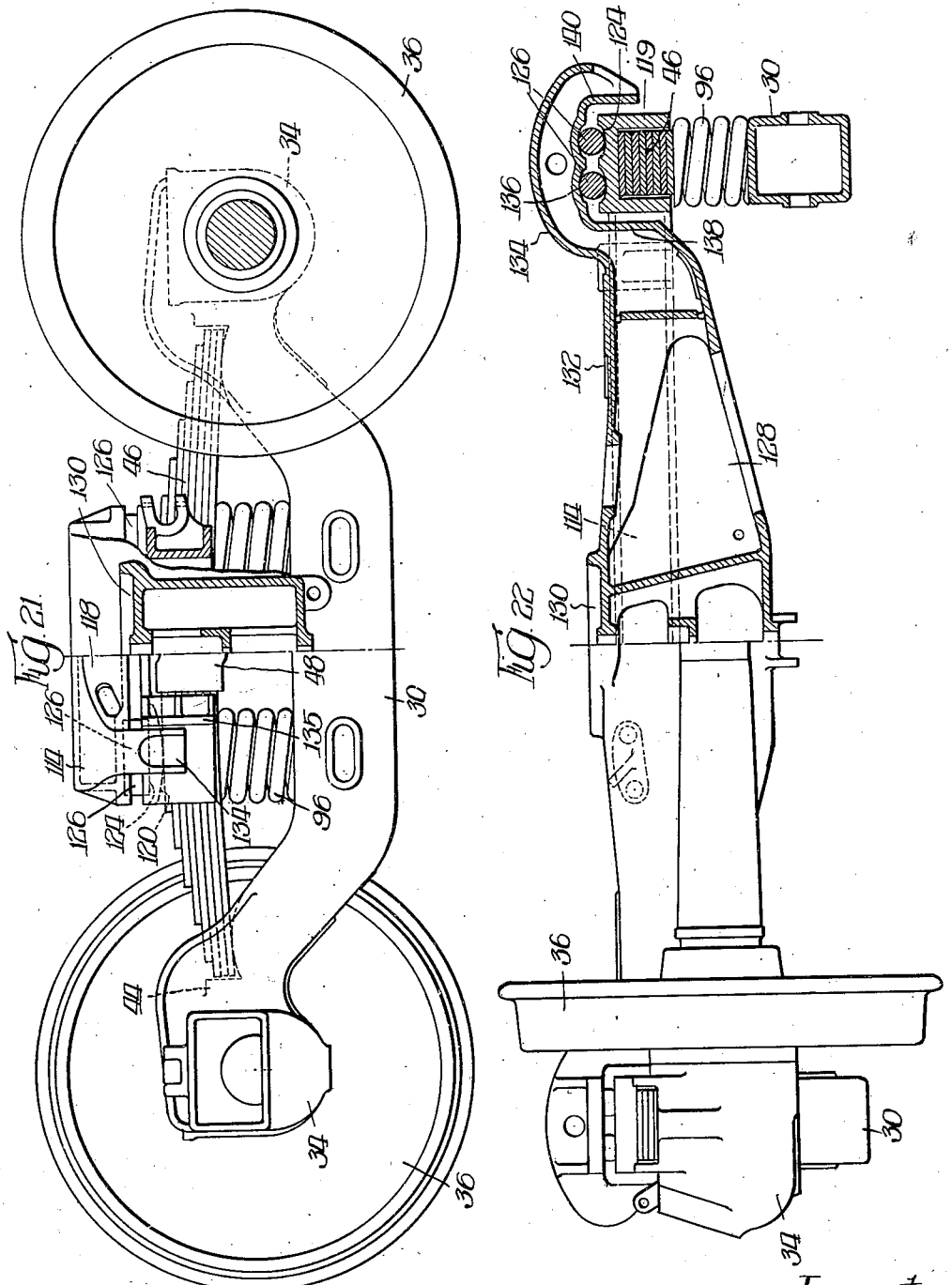

Aug. 18, 1936.　　　　A. H. OELKERS　　　　2,051,650
TRUCK
Filed Jan. 19, 1933　　　　9 Sheets-Sheet 9
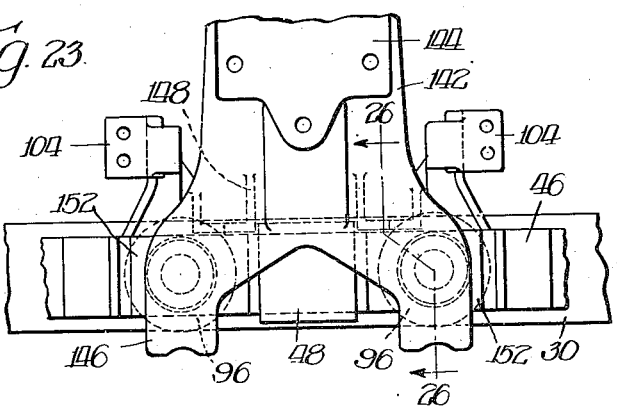
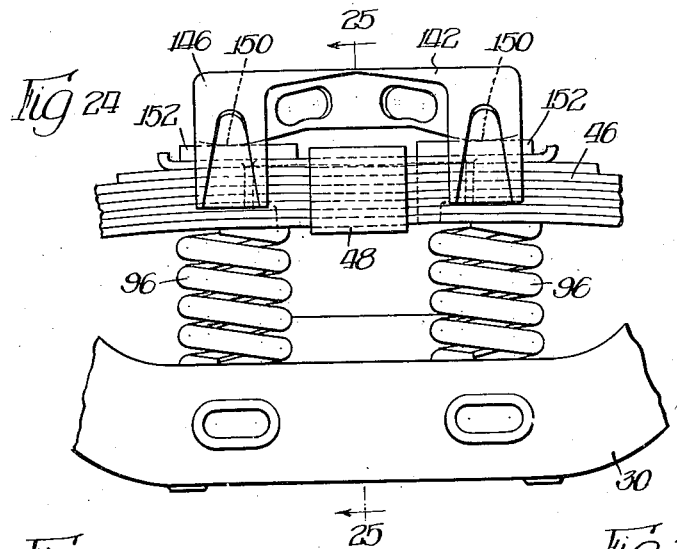
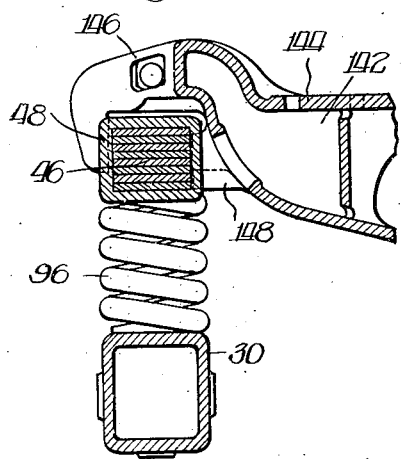
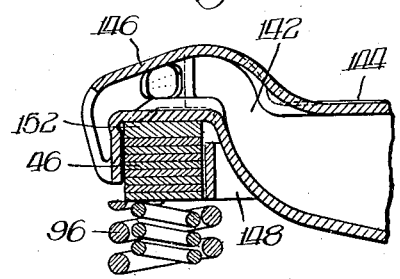
Inventor:
Alfred H. Oelkers,
By Atkinson, Huxley, Byron & Knight
Attys.

Patented Aug. 18, 1936

2,051,650

UNITED STATES PATENT OFFICE 2,051,650

TRUCK

Alfred H. Oelkers, Chicago, Ill., assignor to American Steel Foundries, Chicago, Ill., a corporation of New Jersey Application January 19, 1933, Serial No. 652,448

21 Claims. (Cl. 105—208.1)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

With these and various other objects in view the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation partly in section of a truck construction embodying the invention, the section being taken substantially in the plane of the longitudinal center line thereof;

Figure 2 is an end elevation partly in section of the truck construction shown in Figure 1, the section being taken substantially in the plane of the transverse center line thereof;

Figure 3 is a fragmentary top plan view of the truck construction shown in Figures 1 and 2;

Figure 4 is a fragmentary top plan view corresponding to Figure 3 showing a modified form of truck construction;

Figure 5 is a side elevation partly in section of the truck construction shown in Figure 4, the section being taken substantially in the plane of the longitudinal center line thereof;

Figure 6 is an end elevation partly in section of a modified form of the truck construction shown in Figures 4 and 5;

Figure 7 is a fragmentary top plan view of the truck construction shown in Figure 6;

Figure 8 is a fragmentary top plan view of a modified form of truck construction;

Figure 9 is a side elevation partly in section of the bolster used in the construction shown in Figures 1 to 8 inclusive, the section being taken substantially on the longitudinal center line of the bolster;

Figure 10 is a fragmentary top plan view of the bolster shown in Figure 9;

Figure 11 is a fragmentary bottom plan view of the bolster shown in Figure 9;

Figure 12 is a fragmentary sectional elevation of one end of the bolster showing the supporting relation of the hanger thereto;

Figure 13 is a transverse sectional elevation taken substantially in the plane of the transverse center line of the bolster;

Figure 14 is an end elevation of the bolster;

Figure 15 is an elevation of the hanger for the bolster;

Figure 16 is a side elevation partly in section of the transom construction used in Figures 1 to 4 inclusive;

Figure 17 is a fragmentary top plan view of the transom shown in Figure 16;

Fig. 18 is a fragmentary bottom plan view of the transom shown in Figure 16;

Figure 19 is an end elevation partly in section of the transom construction shown in Figures 16 to 18 inclusive, the section being taken substantially in the plane through the end connecting member of the transom;

Figure 20 is a fragmentary top plan view of another modified truck construction embodying the invention;

Figure 21 is a side elevation partly in section of the truck construction shown in Figure 20, the section being taken substantially in the plane of the longitudinal center line thereof;

Figure 22 is an end elevation partly in section of the truck construction shown in Figures 20 and 21, the section being taken substantially in the plane of the transverse center line thereof;

Figure 23 is a fragmentary top plan view of yet another modified form of truck construction embodying the invention;

Figure 24 is a fragmentary side elevation of the truck construction shown in Figure 23;

Figure 25 is a transverse fragmentary sectional elevation of the truck construction shown in Figures 23 and 24, the section being taken substantially in the plane indicated by the line 25—25 of Figure 24;

Figure 26 is a fragmentary transverse sectional elevation of the truck construction shown in Figures 23 and 24, the section being taken substantially in the plane indicated by line 26—26 of Figure 23.

In the truck constructions illustrated, the side frame 30 consists of the single beam member 32 provided with journal boxes 34 adjacent the ends thereof, the journal boxes being of any preferred construction and having cooperative relation with the journal ends of the wheel and axle assemblies 36. The side frame is depressed intermediate the ends thereof as at 38 and provided with coil spring seats 40. The semi-elliptic arcuate leaf spring seats 42 are provided adjacent the journal boxes, having limiting end walls 44 spaced from said journal boxes and providing thrust lugs for the ends of the semi-elliptic leaf spring assembly 46 extending between the seats 42. The leaf spring assembly is provided with the central spring band 48 adapted to maintain the leaves of the spring in assembled relation to each other and to provide positioning means for a load carrying member.

In the form of the truck construction illustrated in Figures 1 to 22 inclusive, this load carrying member directly engaging the leaf spring is in the form of a transom, whereas the load carrying member illustrated in Figures 23 to 26 inclusive is in the form of a bolster.

Referring now more particularly to the truck constructions illustrated in Figures 1 to 19 inclusive, the load carrying member directly engaging the leaf spring is shown as the transom 50 including the spaced members 52 connected adjacent the ends thereof by means of the integral member 54, the members 52 being depressed intermediate the ends thereof. The member 54 at the end thereof is substantially in the form of a yoke having end portions 56 extending downwardly of the leaf spring leaves, the member 54 being provided with the inner downwardly extending lugs 58 adapted to abut the spring band 48 to provide positioning means for the transom. The spaced members 52 are provided with the brackets 60 and 62 for accommodating a portion of the brake rigging, the bracket 60 being omitted on the transom construction shown in Figures 5 to 8 inclusive.

The spaced members 52 are slotted as at 64 to accommodate the swing hanger 66, the spaced arms 68 thereof being apertured as at 70 adjacent the ends for the reception of pins 72, these pins being maintained in locked position by means of suitable locking members disposed in the apertures of the spaced lugs 74. The spaced lugs are provided on the transom members 52 adjacent the apertures 76 provided therein communicating with the slot 64. The swing hanger is provided with the seat member 78 having the securing lug 80 disposed intermediate the spaced arms 68 and apertured for the reception of locking means 82 receivable therein for securing the bolster to the swing hanger.

The bolster 84 is provided with the center and side bearings 86 and 88 and is of truss construction, the tension member of which extends downwardly adjacent the end thereof and being provided with the hanger seat 90. The tension member has an interrupted portion 92 for the reception of the lug 80 of the swing hanger, the seat 90 being apertured for the reception of said lug. The fastening means 82, it is to be understood, is receivable in the aperture 92 and prevents dissociation of said bolster from said hanger. The bolster is limited in its transverse swinging movement of the truck by means of the inwardly extending lugs 94 provided on the spaced members 52 of the transom.

In each of the truck constructions shown in Figures 1 to 26 inclusive, coil springs 96 are interposed between the seats 40 and the leaf spring 46 and disposed substantially in the vertical plane of the seats 98 provided on the end member 54 of the transom, whereby the load transmitted through the transom seats and the leaf springs to the coil springs causes the leaves of the leaf spring to be pressed together, depending on the load, whereby the frictional absorption of the leaf spring is increased over that of the ordinary leaf spring where no coil springs are disposed as indicated herein.

In the truck constructions illustrated in Figures 4 to 7 inclusive, the side frame is provided with the end bracket 100 provided with the hanger bracket 102 extending outwardly of the wheel and axle assemblies for the accommodation of a hanger for clasp brakes, this truck being particularly adaptable for use on cars to be used in dumping machines or for high speed passenger service and wherein clasp brakes are used. In the truck construction shown in Figure 4 the inner hanger brackets 60 are disposed on the transom. In the truck construction shown in Figures 6, 7, and 8 the inner hanger brackets 104 are provided on the side frame, extending inwardly of the truck and toward the ends of the side frame for the accommodation of the hangers 106 supporting the brake shoes 108, the outer brake shoes 110 being supported by the brake hangers 112 pivoted to the brake hanger brackets 102.

Referring now more particularly to the truck construction illustrated in Figures 20, 21 and 22, the transom 114 consists of the spaced members 116 integrally connected adjacent the ends thereof by means of the portion 118, the portion 118 being provided with the yoke portion 119 embracing the leaf spring 46 on each side of the spring band 48 thereof through the arcuate seats 120 and provided with the inwardly and outwardly positioning flanges or lugs 122 positioned on each side of the spring band 48. The end member 118 is provided with the spaced roller seats 124 for accommodating the lateral motion rollers 126.

The bolster 128 is of substantially truss construction, being provided with the center and side bearings 130 and 132, said bolster being provided with the spaced yoke members 134 extending upwardly over the leaf spring 46 and downwardly on the outside thereof, the yoke being provided with the spaced roller seats 136 for engaging the lateral motion rollers 126, lateral motion of the bolster being limited by means of the inner and outer stops 138 and 140 provided on said yoke portion. The yokes 134 are disposed on opposite sides of positioning or column lugs 135 provided on the transom for fixing the position of the bolster longitudinally of the truck. It is of course to be understood that brake hanger brackets may be provided on the side frame outwardly of the wheels in a manner shown in Figure 4, and also may be provided on the side frame between the wheels as shown in Figure 5.

In the truck constructions shown in Figures 23 to 26 inclusive, while the load carrying member is shown as a bolster, it is of course to be appreciated that the same construction to be described is equally applicable to a transom. In this construction the bolster 142 is provided with the usual center bearing and side bearing 144, said bolster being provided with the spaced end yoke members 146 embracing the leaf spring 46 on each side of the spring band 48. The inner positioning lugs 148 are provided disposed on each side of the spring band 48 for positioning the bolster with respect to the leaf spring and transmitting longitudinal forces directly to the spring band. In the side frame shown the inner brake hanger brackets 104 are shown provided on said side frame. The elliptic spring bearing areas or seats 150 on the bolster are crowned longitudinally of the truck, and in this construction the inside jaw of the elliptic spring seat in the bolster has also been lengthened to provide a greater bearing surface against the edges of the leaf spring. By crowning the spring seat 150 concentration of the load at a point is prevented on the upper shim or seat member 152 provided on the upper leaf of the leaf spring assembly to prevent wear on the spring assembly.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a bolster, the combination of spaced upper and lower members, a main bearing integral with said upper member, a side bearing integral with said upper member, said lower member having a hanger receiving seat integral therewith and spaced therefrom, said seat including an aperture to receive locking means, and a connecting web integral with said upper and lower members and seat.

2. In a truck, the combination of side frames, a member disposed between said side frames and supported on leaf springs interposed between said side frames and member, said member serving as a tie to connect said side frames through said leaf springs, and spring bands provided on said springs for positioning said member, and a load carrying member mounted for lateral movement on said leaf springs through said first named member, the mounting of said load carrying member being in the vertical plane of said leaf springs.

3. In a truck, the combination of a side frame, a frame member having a leaf spring interposed between said side frame and frame member, a spring band cooperating with said spring and frame member, said frame member being loaded at points in spaced relation to said spring band, resilient means interposed between said leaf spring and frame for absorbing part of the stresses imparted to said frame member, and a load carrying member mounted for lateral movement on said frame member substantially in the plane of said leaf spring.

4. In a bolster, the combination of spaced webs, spaced upper and lower members extending between said webs, a main bearing provided on said upper member, said upper and lower members being in substantially vertical alignment, said lower member terminating in a hanger receiving seat within the vertical planes defining said members, and a side bearing on said bolster terminating outwardly of said upper member in a longitudinal direction.

5. A swing hanger of integral construction including a substantially U-shaped member having arms provided with aligned bearing members, a seat portion between said arms, said seat portion being provided with locking means extending above said seat portion and being apertured for connecting a supported load carrying member thereto.

6. In a truck, the combination of a side frame, a longitudinally disposed leaf spring assembly supported thereon and including means for securing the leaves thereof together, a frame member supported on spaced arcuate seats on said leaf spring and a load carrying member supported on said spring through said frame member.

7. In a truck, the combination of a side frame, a longitudinally disposed leaf spring assembly supported thereon and including means for securing the leaves thereof together, a frame member supported on spaced arcuate seats on said leaf spring, a load carrying member supported on said spring, through said frame member, and coil springs interposed between said side frame and leaf spring and substantially in vertical alignment with said seats.

8. In a truck, the combination of a side frame, a longitudinally disposed semi-elliptic leaf spring assembly supported thereon and including securing means, a load carrying member supported on spaced arcuate seats on said leaf spring, coil springs interposed between said side frame and leaf spring and substantially in vertical alignment with said seats, and wear members interposed between said seats and leaf spring.

9. In a truck, the combination of spaced wheel and axle assemblies, a side frame including a rigid member connecting said assemblies, said rigid member having a spring seat disposed adjacent each assembly, a spring assembly disposed between and seated on said seats, a transom having a spring cooperating portion, said transom including spaced members, a bolster located between said members embracing another portion of said transom to position said bolster in respect to said transom.

10. In a truck, the combination of spaced wheel and axle assemblies, a side frame including a rigid member connecting said assemblies, said rigid member having a spring seat disposed adjacent each assembly, a spring assembly disposed between and seated on said seats, a transom having a spring cooperating portion, said transom including spaced members, a bolster located between said members and having a portion embracing said spring assembly to position said bolster in respect to said assembly, and springs disposed between said rigid member and said bolster and cooperating with said spring assembly to transmit load to said rigid member.

11. In a truck, the combination of a bolster, a side frame, a frame member interposed between said bolster and side frame and having cooperative relation with said bolster, and spring members of different character and disposition interposed between said frame member and side frame for accommodating vertical and horizontal loads imposed on said bolster, one of said members including a spring band for securing the parts thereof together, said frame member being supported on said spring members through arcuate seat means.

12. In a truck, the combination of a bolster, a side frame, a frame member interposed between said bolster and side frame and having cooperative relation with said bolster, and spring members of different character and disposition interposed between said frame member and side frame, said spring members being of the leaf and coil type whereby transverse forces and a portion of the vertical load imposed on said bolster are carried by said leaf springs and the balance of the vertical load is carried by said coil springs, said leaf spring member including a spring band for securing the leaves thereof together, said frame member being supported on said spring members through arcuate seat means.

13. In a truck, the combination of a side frame, a frame member having a leaf spring interposed between said side frame and frame member, a spring band cooperating with said spring and frame member, said frame member being loaded at points outside of said spring band, resilient means of a character different from said leaf spring interposed between said frame member and frame for absorbing part of the stresses imparted to said frame member, and a load carrying member mounted for lateral movement on said frame member substantially in the plane of said leaf spring.

14. In a truck, the combination of a side frame, a frame member having a leaf spring interposed between said side frame and frame member, a spring band cooperating with said spring and frame member, said frame member being loaded at points outside of said spring band, a coil spring interposed between said frame member and frame for absorbing part of the stresses imparted to said frame member, and a load carrying member mounted for lateral movement on said frame member substantially in the plane of said leaf spring.

15. In a truck, the combination of spaced wheel and axle assemblies, side frames extending therebetween, a frame member and load carrying member extending between said side frames, a flexible member between said members and each of said side frames, each of said members having seating engagement for transfer of loads in the plane of said flexible members, and means cooperating with said flexible members to load the same to thereby increase the amount of energy said flexible member will absorb.

16. In a truck, the combination of a transom, a hanger secured thereto and having a bolster supporting portion, a bolster having a seat portion cooperating with said first-named portion, one of said portions having an aperture and the other of said portions having a lug projecting therethrough, and means cooperating with said lug to lock said bolster and hanger together.

17. In a truck, the combination of a transom, a hanger hung from said transom and provided with a bolster seat member, said member having an apertured lug, a bolster having a hanger seat cooperating with said seat member and provided with an aperture for receiving said lug, and locking means engaging in the apertures of said lug and cooperating with the hanger seat of said bolster to lock said bolster in place.

18. In a truck, the combination of a transom, a hanger of integral construction secured thereto and having a bolster supporting seat portion, a bolster having a seat portion cooperating with said first-named seat portion, and locking means above the cooperating seat portions of said bolster and hanger to lock said bolster and hanger together.

19. In a truck, the combination of spaced wheel and axle assemblies, spaced side frames each including a rigid member connecting said assemblies, each of said rigid members having a spring seat disposed adjacent each assembly, springs extending between and seated on said seats, a frame member extending between said side frames having a spring cooperating portion adjacent each end and serving as a tie to secure said side frames together, and a load carrying member mounted on lateral motion means disposed on said portion.

20. In a truck, the combination of spaced wheel and axle assemblies, spaced side frames each including a rigid member connecting said assemblies, each of said rigid members having a spring seat disposed adjacent each assembly, springs extending between and seated on said seats, a frame extending between said side frames having spaced members and spaced portions cooperating with said spring adjacent each end and serving as a tie to secure said side frames together, and a load carrying member between said first-named members and mounted on said spaced portions.

21. In a truck, the combination of spaced wheel and axle assemblies, spaced side frames each including a rigid member connecting said assemblies, each of said rigid members having a spring seat disposed adjacent each assembly, springs extending between and seated on said seats, a frame extending between said side frames having spaced members and spaced portions cooperating with said spring adjacent each end and serving as a tie to secure said side frames together, and a load carrying member between said first-named members and mounted for lateral motion on said spaced portions.

ALFRED H. OELKERS.